Dec. 10, 1940.   G. D. WEBBER   2,224,281
MEASURING INSTRUMENT
Filed March 28, 1938   2 Sheets-Sheet 1
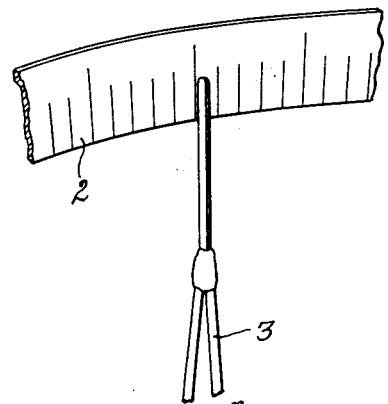
Fig. 1
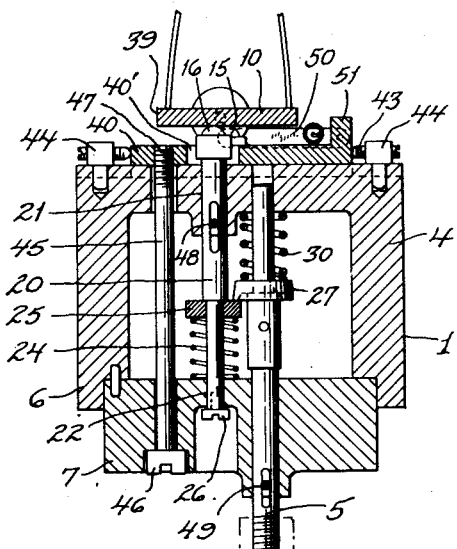
Fig. 2
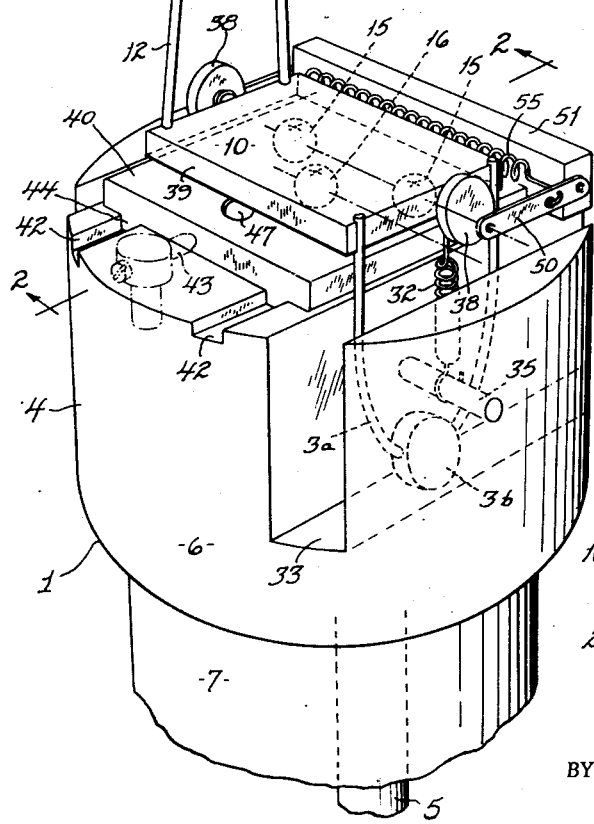
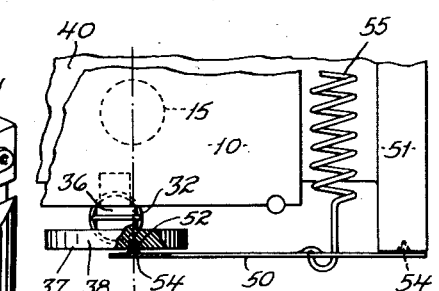
Fig. 4
Fig. 3
INVENTOR.
GEORGE D. WEBBER
BY Bates, Goldrick, & Teare
ATTORNEYS Dec. 10, 1940.  G. D. WEBBER  2,224,281
MEASURING INSTRUMENT
Filed March 28, 1938  2 Sheets-Sheet 2
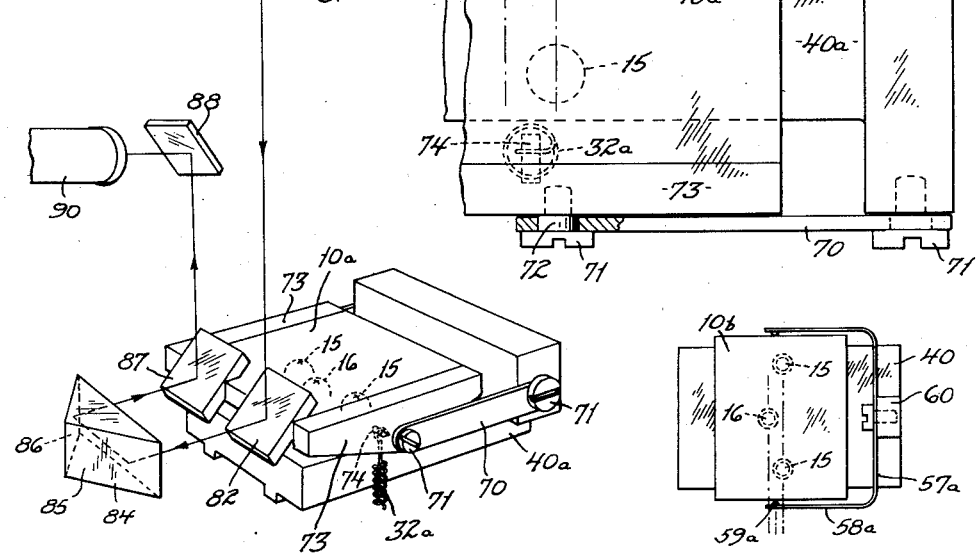
INVENTOR.
George D. Webber
BY Bates, Goldrick & Teare
ATTORNEYS Patented Dec. 10, 1940

2,224,281

UNITED STATES PATENT OFFICE 2,224,281

MEASURING INSTRUMENT

George D. Webber, Cleveland, Ohio, assignor to Webber Metric Gage Company, Cleveland, Ohio, a corporation of Ohio Application March 28, 1938, Serial No. 198,414

14 Claims. (Cl. 33—172)

This invention relates to an improvement in precision measuring instruments, for instance, an instrument adapted to ascertain dimensions of articles of manufacture which are required to be made within close tolerances. The invention is especially adapted for use in mechanical and optical comparators, and certain of the embodiments disclosed can be used effectively as dial gages on machine tools.

An object is to provide an inexpensive support for an indicator or a light reflector or transmitter (optical lever part) by which angular movement of the indicator or lever part is confined to one plane, without interference with free movement of the support in such plane.

Another object is to provide a pivotal support and operating means for an indicator table, on which the table will be free to move substantially in one plane only, but which will permit the instrument employing the table to be operated in any position.

A specific object is to provide an improved mechanical comparator.

Another specific object is to provide a measuring instrument in which measurements are displayed through the agency of an optical lever or combination of optical levers.

Other objects and features of the invention will become apparent from the following description relating to the accompanying drawings, showing the preferred forms. The essential characteristics are summarized in the claims.

Referring briefly to the drawings, Fig. 1 is a perspective view, showing a measuring instrument unit arranged for use e. g. in a mechanical comparator or dial gage; Fig. 2 is a longitudinal central sectional view thereof as indicated by the line 2—2 on Fig. 1; Fig. 3 is an enlarged fragmentary side elevation of an indicator table or beam and a supporting and stabilizing arrangement for it; Fig. 4 is a fragmentary detail plan view showing one side of the table and a modified form of stabilizer; Fig. 5 is a plan view of another modified form of stabilizer; Fig. 6 is a diagrammatic view showing a modified pivotal support for the table; Fig. 7 is a view similar to Fig. 1, largely diagrammatic, showing an optical system employing the invention; Fig. 8 is a fragmentary plan view according to Fig. 7; Fig. 9 is a diagrammatic perspective view illustrating another arrangement of optical instrumentalities; and Fig. 10 is a plan view of a modified construction of table and stabilizer, such for instance, as shown in Fig. 9.

The unit 1, shown in Fig. 1, is of substantially the same type as the measuring mechanism unit shown in my application, Serial No. 164,171, filed September 16, 1937, and may have a dial housing (not shown) carrying a scale 2 traversed by an indicator arm 3 supported on a head or frame 4 which may be of generally cylindrical form as shown, so that it may be clamped in any turned position adjacent a machine tool for centering or measuring (as a dial gage) or in an operating standard including a work support for use as a comparator with e. g. gage blocks to set it for a series of measuring operations. The unit may have a movable feeler pin 5 adapted to contact with work to be measured or tested or with such gage blocks as usual. The controlling or actuating means including the feeler and some of the parts operated by it, could be replaced by means enabling e. g. weight, flow, temperature, etc., measuring operations to be effected.

The cylindrical frame 4 may comprise a top piece 6 and a bottom piece 7 of suitable metal, the two slidably supporting the feeler 5 in suitable bores as shown in Fig. 2. The feeler 5 actuates or controls the position of a table or beam 10 which in this specific form is the short arm of a mechanical lever, the indicator 3 being the long arm. The indicator may be made of light wire with leg portions 12 inserted in openings or notches in the table and fastened as by solder. The indicator swings parallel with the scale out of contact therewith but close thereto for easy reading.

A counterweight for the indicator arm is shown as a loop of wire 3a secured to the table, as on the opposite side thereof from the indicator and depending therefrom; having a weight piece 3b in proper position to counter-balance the indicator. This device permits the instrument to be used effectively in any position as for dial gage work in centering rotating bodies or measuring distances at any angle to vertical or horizontal planes. The weight piece can depend directly below the indicator and comprise extensions of its legs.

Referring further to Figs. 1 to 3, the table or beam 10 comprises, as shown, a flat, rectangular piece of metal, carefully finished on its bottom side (and at least one edge for point locations). The table rests on a fixed fulcrum, shown as two spherical surfaces, each of which has a single point contact with the plate. The spherical surfaces may be afforded by calibrated steel balls 15 of the type used for bearings. A slight distance away from the vertical plane of the two balls (transversely of the table), the plate rests on a movable support also shown as a ball 16, which is connected with the feeler 5 in such manner that upon movement of the feeler by the work, the table 10 is tilted on the balls 15. Knife edges or cone points or circular discs can be used instead of the spherical supports. The ball supports are much simpler to make, than knife edges or points, and wear on the balls in the course of time is insignificant. Calibrated ball bearings of extreme accuracy can now be purchased as standard parts and are easy to mount either fixedly, as the balls 15, or on a moving part as in the case of the ball 16. No V-notches are required in the construction, thereby greatly simplifying accurate manufacture of the table or beam 10. It is almost impossible to form the apex of a V-notch in a single piece of metal, without a slight fillet.

As the table is tilted, the bottom surface thereof moves in contact with (rocks around the axes of) the balls 15 and 16; and while, actually (assuming the balls cannot rotate) the surface must slide either on the ball 16 or on both 15 and 16 when the table tilts from horizontal position, the movement of the indicator is found very steady in actual practice. The table can be held in contact with the spherical supports by gravity or suitable springs to be later described.

The ball 16 may be secured as by a spinning operation in a complementary socket centrally of the top end of a sliding pin 20, which is guided in aligned bores 21 and 22 in upper and lower wall portions of the frame 4. The pin 20 has a close sliding fit in both bores and can be keyed against turning in order to avoid having to center the ball accurately on the pin axis. To hold the ball 16 in contact with the underside of the table at all times, there is provided a very light coil spring 24 reacting at its upper end against a collar 25 on the pin and at its lower end against the bottom piece 7 of the frame. Upward movement of the pin may be limited as by the head of a screw 26 below the piece 7 or in any other way so that the plate 10 will not be lifted out of engagement with its fixed fulcrum. The connection between the feeler 5 and pin 20 is impositive so that the feeler cannot damage the working parts if raised too high under a considerable force. The feeler 5, as previously mentioned, is slidably mounted in the upper and lower pieces 6 and 7 in the same manner as the pin 20 and, within the hollow interior of the frame, the feeler has a disc member 27 overhanging a portion of the collar 25 at one side so that relative upward movement of the feeler pin 5 allows the spring 24 to cause the pin 20 to follow the feeler. Upward movement of the feeler pin is resisted by a spring 30, which is of the necessary strength to produce the desired pressure of the feeler pin on the work. In any event, the spring 30 exerts a considerably greater force than the spring 24, in order that the feeler pin cannot be moved by the spring 24. When the feeler pin is moved toward the frame 4 by the work, the spring 24 maintains contact between the members 25 and 27, and the table 10 is tilted to a degree determined by the amount of movement of the feeler pin 5.

In order that the abutment relationship between the disc members 25 and 27 of the pin 20 and feeler 5 will not be changed during use of the instrument by relative turning of the disc members, turning of both the pin and feeler may be prevented by cross pins 48 and 49 in slots of the pin 20 and feeler respectively.

To maintain the table in contact with both sets of spherical supports (15 and 16), I may provide tension springs 32 which occupy slots 33 in the frame piece 6. The springs may be anchored to the frame as on pins 35 extending into the slots. At their upper ends the springs may be looped to embrace reduced shank portions 36 of pins 37 extending laterally from the table. As suggested in Fig. 4, the pins 37 may be pressed into suitable aligned bores in the opposite sides of the table between the supporting planes of the two sets of balls. The pins 37 have disc-like heads 38 which serve effectively to anchor stabilizer links to be later described. The springs 32 are very light; it being necessary that their effective strength shall not be greater than that of the spring 24 on the ball supporting pin 20, in any position of the table.

Adjustment between the fixed and movable balls, as is usually necessary in order to change the throw of the indicator 3 with reference to the scale for calibration, is accomplished by sliding a plate 40 which supports the balls 15. Such adjustment need never be disturbed after original setting. The balls 15 are fixed to the plate 40 as in cups or cupped posts, as desired, and the plate can be guided for movement normal to the supporting planes of the two sets of balls by reason of depending ribs 41 in parallel guide channels 42. There is an enlarged opening 40' through which the pin 20 carrying the ball 16 passes, so that the plate may be moved back and forth in changing the length of the short arm of the lever (distance between ball centers).

The plate 40 is usually adjusted initially by a special temporary fixture having micrometric movement. However, as shown, there are screws 43 in blocks 44 set into the top piece 6 of the frame, the screws having their ends adapted for engaging opposite ends of the plate. For anchoring the plate, after adjustment, I preferably use a screw 45 which enters the frame from the bottom, has a head 46 relatively underlying the frame, and is threaded as at 47 into the lower side of the plate 40. The receiving bore or bores for the clamp screw 45 in the frame may have a few thousandths of an inch clearance so as to permit the necessary lateral movement of the clamp screw.

One stabilizing arrangement for holding the table 10, particularly against rotational displacement on the supports 15 and 16, but which connection will not interfere with the necessary free tilting movement of the table, comprises the provision of a set of links 50 between the table and part of its support, such, for instance, as an upstanding bracket 51 at one end of the adjustable plate 40. The links are so associated with the table that the table is operatively engaged by the links in such manner as to fix the rocking center of the table, on the centers of the balls 15. The heads 38 of the pins 37 may be made sufficiently large in diameter to extend past the rocking center, and by measuring from a finished face such as 39 of the plate 10 and downwardly from the finished bottom face of the plate one may locate the rocking center on both heads 38 and prick-punch them to form small cone bearing supporting sockets 52 for the outer ends of the links. The sides of the bracket 51 are similarly prick-punched at the same elevation. The links which may be light spring-tempered sheet metal strips, can have conical points 54 punched on them as indicated in Fig. 4; and may be held with the points seated in the conical sockets by a single spring 55 bearing on both links in line with their points 54. The apex angle of the points is, of course, slightly less than the angle of the prick-punchings for true "point" bearing contact between the strips and the table and bracket.

The links cause the table to rock around the fixed ball centers and while the bottom surface of the table must slide on the balls 15, in the arrangement shown, the fixed pivots or points of attachment of the links may be located approximately on the center of an arc which nearly coincides with the curve of the sockets 52 in case the plate simply rolls on the balls 15 but does not slide.

Since the rocking center of the plate 10 does not shift with respect to the plate 40 in the operation of the instrument, the links, as shown in Fig. 5, may be made as a single U-shaped piece 57 of wire or sheet metal having spring arms 58 with bearing points 59 adapted to be seated in the conical sockets of the heads 38 or any other part of the table by the spring of the arms toward the table. The base portion of the member 57 is secured to an upward projection 60 of the plate 40 as illustrated in Fig. 5; leaving free "base" portions of the U at each side of the projection for slight spring effect if needed.

In an instrument that is designed always to be operated in upright position (see Figs. 9 and 10) the construction can be simplified by omitting the pins 37 for the hold-down springs 32, together with such springs and so arranging the stabilizer arms 58a that their points 59a engage prick-punchings directly in the sides of the table which are shown as dropped below the finished surface of the table which rests on the fixed and movable supports 15 and 16. The points 59a can be located between the vertical transverse planes of engagement of such bottom surface with the ball supports 15 and 16 so that the stabilizer can function as a hold-down spring by reason of the torsional spring of the free cross-portions of the attached base 57a of the stabilizer.

Fig. 6 illustrates an economical construction that may be used instead of the spherical supports for the table 10. Posts 65 and the upper portion 66 of a pin corresponding to the pin 20 may be finished at the ends with oppositely beveled surfaces as indicated; each providing a single point contact with the table as on the axes $a$ and $a'$. In such case the links 50 or 58 would be secured to the table at the axis $a$, in line with the lower pin-contacting surface of the table.

All of the above described principles can be utilized in measuring instruments, irrespective of the type of measurement desired, for instance, space, weight, temperature, flow, etc.; and irrespective of how the table 10 operates to convey or transmit the desired information. Two adaptations for transmitting the tilting motion of the table or beam by optical means are shown in Figs. 7 to 10. The novel features of the optical instrumentalities will be claimed in a copending application.

The stabilizing means for the beam or table (10a and 10b in the respective modification of Figs. 7 and 9) can be somewhat simplified in the employment of the mechanism hereof with optical instrumentalities, principally because the distance between the fixed support of the table and the point of contact of the actuator therewith can, in many cases, be as much as .150", whereas in the case of use as a mechanical comparator or dial gage where the length of the indicator arm is limited by weight and deflection factors, said distance should be considerably less, say in the neighborhood of .010".

As shown in Fig. 7, the table or beam 10a has a flat bottom surface in contact with spherical supports 15 and 16, as previously described. The stabilizer arms 78 may be connected both to the table and to the supporting plate 40a by cap screws 71, having reduced cylindrical shank portions 72 between the heads and threads a few thousandths of an inch longer than the thickness of the links 70, so as not to bind the links. The links have openings which nicely fit the cylindrical shanks 72 but so as not to restrain free movement on the supporting balls. The screws are in line with the axis of generation of the spherical supports 15, both horizontally and vertically, and in order to provide supports for the screws below the smooth bottom face of the table or beam 10a, the table may have downward extensions formed as integral parts of the table or separate pieces as at 73. The extension pieces 73 may carry pins 74 (shown on their inner sides) for hold-down springs 32a, or such hold-down springs can be secured to the heads of the screws 71 by making the heads wide enough to support spring attachment pins in a region between the transverse vertical planes of the spherical supports. This would be substantially the reverse of the arrangement described in connection with Figs. 1 to 4, for the hold-down springs and stabilizing links and needs no illustration. The above construction of stabilizing linkage does not require any spring connection between the links to hold the links in operating position.

Referring to the optical system as shown in Fig. 7, this comprises a light-source 80, a transparent or translucent scale 81 extending lengthwise of the table (i. e. parallel to its tilting movement), the image of which scale is projected by the light-source onto a reflector 82, mounted in diagonal position at one edge of the table 10a and adjacent its top face as in suitable retaining notches. This may reflect the image directly onto a distant screen, but in order to condense the optical elements into a relatively small space, while obtaining considerable effective optical lever length, the reflector 82 is arranged to project the scale image onto a transparent reflecting prism 84, having angularly disposed reflecting (back) surfaces 85 and 86, for imposing the scale image onto a reflector 87 mounted on the table adjacent the reflector 82 or comprising merely a lateral extension of it. The reflector 87 may impose the scale image on another reflector or mirror 88, appropriately mounted as in a suitable housing above the reflector 87 for transmission of the image as by a projector onto a suitable screen or, alternatively, into a telescope 90, having an eyepiece and index mark (not shown) for observation in convenient relationship to a measuring feeler member of a comparator for distance measurement.

The importance of the stabilizer arms in the optical arrangement just described will readily be apparent since rotational movement of the table 10a on its spherical supports could move the image of the scale out of the range of vision of the operator using such telescope or, as due to unsteadiness, result in an inaccurate reading. The previous arrangements employing ball supports or substantially their operative equivalent had always I believe, reflector surfaces (cf. 82) parallel with the surface of the table which engaged the supports. With such arrangement rotational movement (skewing) of the table would not be disadvantageous because it would reflect the image imposed on it in one turned position the same as in another.

In the other optical system, Fig. 9 the light-source 90 is behind the work engaging members of the measuring mechanism, and so related to a transparent or translucent scale 91 that an image of the scale is projected, as through a compound achromatic objective lens 92, suitably supported in fixed position in the housing, onto a reflector 93 disposed upright on the top surface of the table 10b which rests on relatively fixed and movable tilting supports such as balls 15 and 16. In this case, as in the optical arrangement of Fig. 7, shifting of the table 10b on its spherical supports (in the plane of the table) would displace the image horizontally out of proper relationship to the telescope (if used) or to a screen such as shown, (described below).

The reflector 93 may transmit the scale image back through the lens 92 to a 90° reflecting prism 94 disposed closely beside the scale in fixed position and with its front face parallel to the scale. The prism in turn transmits the image through a magnifying eyepiece 95 which is appropriately arranged to focus the image on a screen 96 (e.g. ground glass) with an index mark on it, as indicated at 97. This arrangement is preferred to the Fig. 7 arrangement for a shop comparator, because it presents the scale image in more convenient position for observation by an operator while adjusting the work in contact with a feeler. With the tilting centers of the table supports 15 and 16 spaced .050" and with the lens 95 arranged for a magnifying ratio of 1 to 5 the measuring feeler movement and scale image movement ratio (in one design) is .001 to 1.

The uses of the various forms of the invention shown are not limited to direct reading, as by sight. For illustration, I contemplate modification of the indicating means controlled by the tilting table or beam 10, 10a, 10b, etc., for the operation of a stylus on a moving record strip, or the affixing of an image on such strip photographically, as with optical systems such as shown or modifications thereof. In making such record, (say of continued measuring operations such as grinding or the continuous checking of metal strip thickness) stronger springs can be used to tilt the table or beam in one direction so that the record can be made mechanically as by a stylus on material which places considerable work on the table or beam in moving the stylus thereover.

I claim:

1. In a measuring instrument having a beam with substantially coplanar surface portions which are in pivotal contact respectively with relatively fixed and movable members, the latter of which tilts the beam on the fixed member, arm members connected with the beam on opposite sides of it generally in the region of its tilting axis, said members extending away from said axis, in the direction of extent of the longitudinal axis of the beam; remote portions of the arms being anchored whereby to prevent rotation of the beam in a plane parallel to said surface portions.

2. In a measuring instrument having a beam with substantially coplanar surface portions in pivotal contact with relatively fixed and movable members, the latter of which tilts the beam, and means pivotally connected with the beam on opposite sides of it substantially at its tilting axis, said means comprising arm members extending substantially in the normal direction of extent of the beam and being out of contact therewith except in the region of the pivotal connections, and means to support the remote ends of the arms.

3. In a measuring instrument, a frame, an actuator movably guided by the frame, a beam arranged to be tilted by the actuator and adapted to cooperate with a scale in a manner to indicate the movement of the actuator in a position remote from the actuator, said beam having a relatively flat surface, a fixed member engaging the flat surface as a fulcrum for the beam, and means comprising links extending in the direction of the length of the beam and additional yielding means connected to the beam and acting thereon in a direction normal to the flat surface, both said means connecting the beam and the frame whereby to prevent rotation of the relatively flat surface in its own plane on the fulcrum.

4. In a measuring instrument, a motion translating beam or table having coplanar surface portions in pivotal contact with fixed and movable supports, the latter being an actuator for tilting the beam about the fixed support, and wherein the contact between the beam or table and the support is such that the beam or table could normally float parallel to said coplanar surface portions; a pair of arm members extending in a direction generally parallel with said surface and having cone and socket connections with the beam and means to support the remote ends of the arms whereby to stabilize the beam against movement in a plane parallel to said surface.

5. A measuring instrument according to claim 4 wherein the cone-and-socket bearing contacts are substantially at the tilting axis of the beam and are yieldingly maintained.

6. A measuring instrument according to claim 4, wherein the arms are connected together by a spring in a manner to impose uniform pressure at both cone and socket connections.

7. A measuring instrument according to claim 4, wherein the pivotal connections of the arms and beam lie in a plane between that of the tilting axis and the axis of the movable support, and the arms are arranged yieldingly to urge the relatively flat surface of the beam toward its pivotal supports.

8. In a measuring instrument, a motion translating beam in pivotal contact with fixed and movable supports, the latter being an actuator for tilting the beam, a U-shaped resilient member having points at its ends pivotally engaging conical sockets in the beam or parts of it in the general region of the tilting axis of the beam, and means connecting the base portion of the U-shaped member with a fixed part of the instrument, near one end of the beam so as to stabilize the beam.

9. In a measuring instrument, a motion translating beam having a relatively flat surface on one side, pivotal supports for the beam in contact with said surface for determining the tilting axis of the beam, a movable actuator disposed adjacent said axis and arranged to move toward and away from the beam to tilt it, pins extending in opposite directions from the beam with their axes in a plane between the tilting axis and the axis of movement of the actuator, springs connected to the pin coaxially therewith and additionally to fixed portions of the instrument for holding the flat surface in contact with the pivotal supports, heads on the pins which extend laterally therefrom beyond the tilting axis, and stabilizer means in addition to the springs and connected with said heads substantially at said tilting axis and additionally connected to fixed portions of the instrument, said means preventing skewing movement of the flat surface on the pivotal supports.

10. In a measuring instrument, a beam having a relatively flat surface, relatively fixed and movable members both in pivotal contact with the surface, one adapted to be displaced by the work to be measured, means on the beam including a surface adapted to divert or transmit a light beam for optically projecting the movement of the beam which latter surface extends at an angle to the relatively flat surface of the beam, and stabilizing link members pivotally connected to the side edges of the beam and additionally connected to fixed portions of the instrument in a manner to prevent displacement of the relatively flat surface in its own plane on the relatively fixed and movable members.

11. In a measuring instrument, a beam adapted and arranged to be tilted for displaying or transmitting a measurement, said beam having a relatively flat surface, relatively fixed and movable pivotal supports for the beam, whereby it may be tilted, one of said supports comprising a cylindrical pin which has a planar diagonal face at its end so as to form with one circular side surface an acute angle, the apex of which contacts with such flat surface of the beam.

12. In a measuring instrument having a beam adapted to transmit information to a remote point, a rocking support for the beam including fixed and movable members in contact with the beam, a guide for the movable member, means for stressing the movable member toward the beam, a feeler pin and a guide for it generally parallel to the movable member, one-way-acting abutments between the member and feeler, a spring acting on the feeler in a direction opposite the direction of action of the stressing means and tending to hold the abutments in contact with each other, said spring having greater effective force than the stressing means, and the feeler pin being movable, in a direction to stress the spring, a distance greater than the movable member can be moved toward the beam.

13. In a precision measuring instrument of the type having a frame and a lever element with substantially coplanar surface portions in pivotal contact respectively with a relatively fixed member and a relatively movable member, and in which the lever element would normally be free to float in a plane parallel to the coplanar surface portions; stabilizing means pivotally connected with the lever element closely adjacent one region of pivotal contact aforesaid and connected to the frame in a region remote from the aforesaid region of connection lengthwise of the lever element, whereby to prevent such floating movement of the lever element.

14. In a precision measuring instrument of the type having a frame, a lever element adapted for transmitting motion with reference to a scale, an actuator element movable in a direction to swing the lever element, and a fulcrum element in close proximity to the actuator element and about which the lever element swings, and in which the surface contact between the lever element and said other elements is afforded wholly by spherically surfaced members bearing on flat surfaces so that the lever element would normally be free to float in a direction parallel to the flat surfaces; the improvement comprising spherical surfaces on the lever element formed about a common axis directed transversely of the lever element, the latter spherical surfaces being located beside the beam in reference to the plane in which the lever element swings and approximately in transverse alignment with the region of spherical and flat surface contact aforesaid, and means connected to the frame and having portions bearing on said latter spherical surfaces of the lever element in opposite directions lengthwise of the lever element for preventing such floating movement.

GEORGE D. WEBBER.